United States Patent [19]

Eugen

[11] Patent Number: 4,722,718
[45] Date of Patent: Feb. 2, 1988

[54] CONTINUOUSLY VARIABLE TRANSMISSION FOR MOTOR VEHICLES

[75] Inventor: Svab Eugen, Cologne, Fed. Rep. of Germany

[73] Assignee: Ford Motor Company, Dearborn, Mich.

[21] Appl. No.: 924,949

[22] Filed: Oct. 30, 1986

[30] Foreign Application Priority Data

Nov. 2, 1985 [DE] Fed. Rep. of Germany ....... 3538884

[51] Int. Cl.$^4$ .............................................. F16H 11/06
[52] U.S. Cl. ......................................... 474/19; 474/28
[58] Field of Search ....................... 474/18, 19, 21, 28, 474/72, 74, 8

[56] References Cited

U.S. PATENT DOCUMENTS

| 4,261,213 | 4/1981 | Rattunde | 474/19 X |
| 4,467,669 | 8/1984 | Kawamoto | 474/72 X |
| 4,583,423 | 4/1986 | Hahne | 474/28 X |

FOREIGN PATENT DOCUMENTS 3028490  1/1983  Fed. Rep. of Germany .
3241789  8/1985  Fed. Rep. of Germany .

Primary Examiner—Stephen J. Novosad
Assistant Examiner—Thuy M. Bui
Attorney, Agent, or Firm—Donald J. Harrington; Keith L. Zerschling

[57] ABSTRACT

A continuously variable belt drive comprising adjustable primary and secondary sheaves, a primary shaft connected drivably to an axially fixed cone sheave part and to a companion axially displaceable cone pulley part, an axially displaceable actuating servo cylinder connected to said axially displaceable cone pulley part, an actuating servo piston connected to said primary shaft including cam follower members connected respectively to said primary shaft and to a torque input clutch, one follower member defining in part a pressure regulating valve element that regulates the magnitude of the pressure in the actuating servo.

3 Claims, 2 Drawing Figures

CONTINUOUSLY VARIABLE TRANSMISSION FOR MOTOR VEHICLES

BACKGROUND OF THE INVENTION

Continuously variable cone pulley transmissions for motor vehicles are known in the prior art. An example is the transmission shown in German Pat. No. 30 28 490, in which a part of the primary pulley assembly is axially displaceable by the fluid displacement piston of a hydraulic displacement servo. The displacement piston of the displacement servo is connected in an axially rigid manner to the driving shaft of a continuously variable cone pulley transmission. It is surrounded by a displacement cylinder secured to the axially displaceable pulley part.

To produce the desired clamping forces as a function of the load, the primary shaft that supports the primary pulley is provided with a sensor for the torque transmitted by it. This torque sensor comprises a driving collar that is axially rigid with respect to the primary shaft but rotatable relative thereto. It is connected by way of meshing teeth to a rotary ring, the front side of which forms an annular piston received in an annular cylinder in the rigid cone pulley so as to be rotatably and axially displaceable. The rear side of the rotary ring is formed with a V-shaped curved track. A support ring adjacent the rotary ring likewise comprises a V-shaped curved track. Rolling elements, such as steel balls, are disposed between the tracks. The support ring is rotationally and axially rigid with respect to the driving shaft. Pressure fluid is supplied to the torque sensor in the region of the cylinder-piston assembly by means of a duct. It normally can flow away by way of another duct. The other duct is arranged in such a way that it is overlapped and controlled by one edge of the front side of the rotary ring acting as an annular piston. That control occurs when the rotary ring is rotated relative to the support ring upon a change in torque and is axially displaced by the rolling elements between the V-shaped curved tracks.

In this way, as the torque increases, the discharge duct cross-section is progressively reduced resulting in a control pressure that is proportional to the torque. The control pressure acts upon the main pressure control valve and produces a corresponding increase in the pressure of the system.

Another prior art continuously variable transmission unit for motor vehicles is shown in German Offenlegungsschrift (Laid Open Specification) No. 34 41 789. It has two hydraulically controllable friction disc clutches for engaging a forward gear or a reverse gear by means of a set of gear shifting planet wheels, the planet wheel carrier of which can be coupled by the forward gear clutch to a sun gear connected to the primary shaft of a continuously variable belt-drive transmission. The continuously variable belt-drive transmission has an axially displaceable cone pulley part on the primary shaft which is axially displaceable on the primary shaft. The pulley part that is axially stationary is a cone pulley connected to part of the piston of an hydraulic displacement device. The piston of the displacement device is connected in an axially rigid manner to the primary shaft part of the continuously variable belt-drive transmission. It comprises a stationary cone pulley part and is surrounded by the displacement cylinder secured to the axially displaceable cone pulley part.

BRIEF DESCRIPTION OF THE INVENTION

The invention is an improvement in a continuously variable transmission for a motor vehicle comprising a torque sensor of the type described above. The torque sensor is adapted to be assembled in a restricted space. A minimum number of changes is required to be made in the transmission to accommodate the torque sensor. Simplified fluid pressure control passages are formed in the pulley and shaft assembly.

The axially stationary displacement piston comprises a sleeve part, which is secured to the guide hub of an axially displaceable pulley part and is connected axially and rotationally rigidly to an axially stationary cone pulley part. It is axially displaceable relative to the guide hub by reason of a splined connection. The sun wheel of a planetary gear set is disposed axially rigidly but rotatably relative to the axially stationary cone pulley part. It forms a driving element for both the forward gear clutch and the rotary ring which on its front side forms an annular piston. That annular piston is received in an annular cylinder formed in the axially stationary displacement piston. The rear side of the piston comprises a first V-shaped curved track which cooperates by means of interposed rolling elements (e.g., balls) with a support ring. The support ring likewise comprises a V-shaped curved track disposed axially and rotationally rigidly on the sleeve part that is connected to the driving shaft.

A pump driving shaft extends through the primary shaft. Inserted in the pump driving shaft is a separation pipe which, with the pump driving shaft, forms a pressure fluid duct. The duct supplies the pressure space of the cylinder-piston assembly of the torque sensor with pressure fluid by way of radial bores and by way of spaces in the splined connection as well as by way of the duct. It is possible for the torque sensor and its pressure fluid supply to be formed merely by modifying the components that form the stationary displacement piston and the sun gear with its driving element. Inserting the separation pipe in the pump driving shaft may be done without a need to change the dimensions of the casing of an existing transmission unit.

DESCRIPTION OF THE FIGURES OF THE DRAWINGS

The invention is described in greater detail with reference to the embodiment illustrated in the drawings, in which.

PARTICULAR DESCRIPTION OF THE INVENTION

Figure 1:
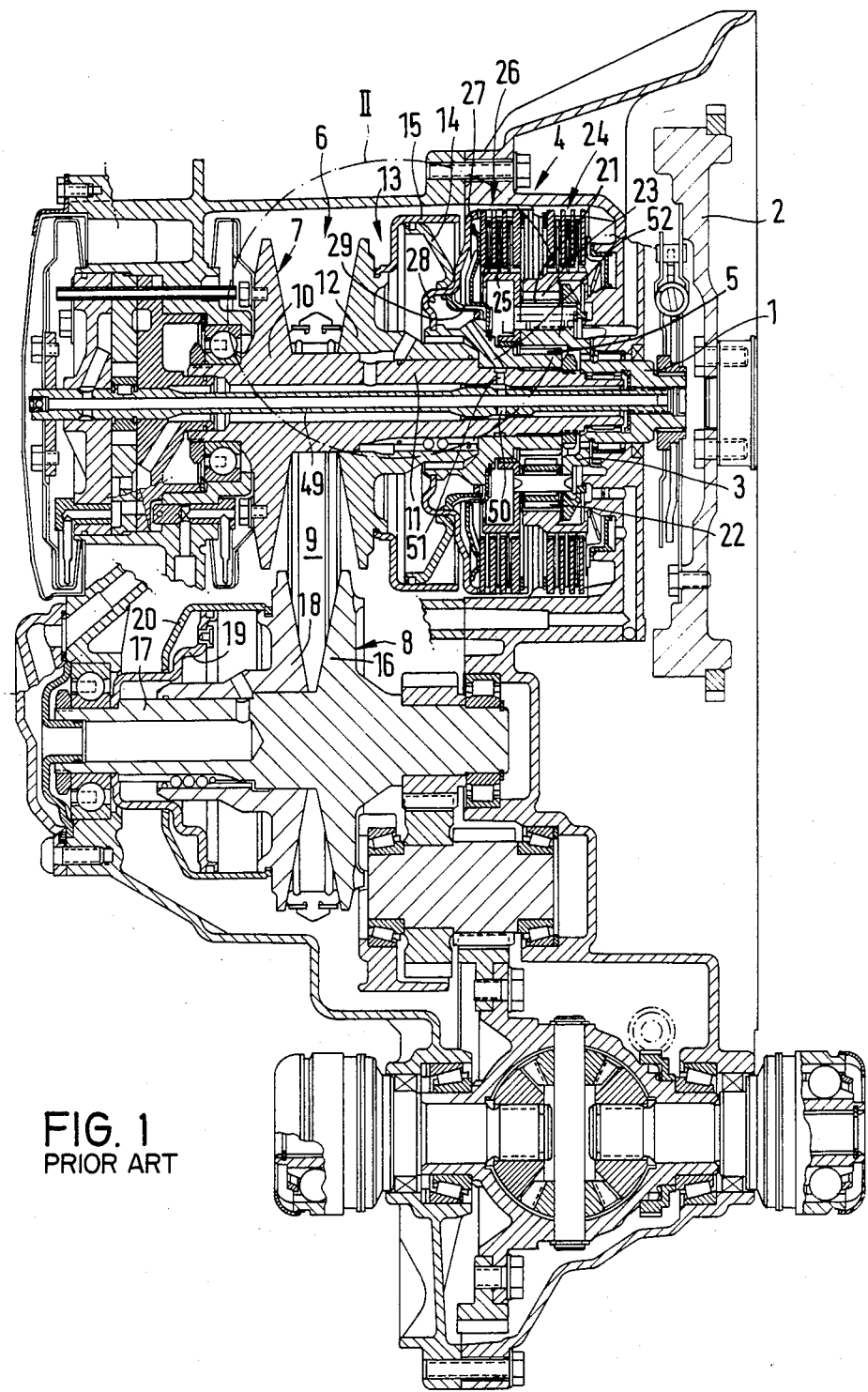
FIG. 1 shows a prior art continuously variable transmission unit for front wheel drive motor vehicles.

A continuously variable transmission unit for front wheel drive motor vehicles, which is very compact in terms of its axial and radial dimensions, is shown in FIG. 1. An input shaft 1 is connected directly to the driving engine by a damping disc arrangement 2.

The input shaft 1 is connected driveably to the planet gear carrier 3 of a gearset, the sun gear 5 of which forms the input member for the continuously variable belt-drive transmission 6, which is located downstream and which essentially comprises a primary shaft 7, a secondary shaft 8 and an infinitely variable belt or chain 9.

The primary shaft 7 comprises a primary shaft part 11, which has a stationary cone pulley part 10. It is constructed as a hollow shaft on which is mounted an axially displaceable cone pulley part 12, which can be displaced by means of an hydraulic displacement device 13. A stationary displacement piston 14 and a movable displacement cylinder 15 comprise the device 13.

The secondary shaft 8 comprises a secondary shaft part 17, which comprises an axially stationary cone pulley part 16 formed on one side as a hollow shaft. Cone pulley part 18 is mounted for axial displacement on the hollow shaft. Part 18 is displaced by means of an hydraulic displacement device comprising a stationary piston 19 and a movable cylinder 20. The secondary shaft 8 forms the output shaft of the belt-drive transmission.

The sun gear 5, which forms the input member of the belt-drive transmission 6, is connected rotationally and rigidly on the primary shaft part 11 of the belt-drive transmission. Planet carrier 3 has two sets of planet wheels 21 and 22, of which one set 21 engages the sun wheel 5. Both sets engage one another and the second set 22 engages the annular gear 23. On its outer periphery the ring gear 23 carries clutch discs for a reverse gear clutch 24, by means of which the ring gear can be secured to the transmission casing. Thus, the direction of rotation of the sun gear 5 can be reversed with respect to the direction of rotation of the input shaft 1.

One side of the planet gear carrier 3 is connected to a clutch drum 25, the outer periphery of which engages discs of a forward gear clutch 26. The comparison discs of clutch 26 are arranged on a driving collar 27 which is directly connected rotationally and rigidly to the sun gear 5, the driving collar 27 forming an annular cylinder 28 for a corresponding annular piston 29 acts upon the forward gear clutch 26

The description of FIG. 1 up to this point corresponds to a transmission unit of the type known in the prior art as described in German Offenlegungsschrift 32 41 789, wherein a torque sensor is unnecessary when using a pusher element belt.

The torque sensor of the invention will be described with reference to FIG. 2. The region inside the stationary displacement torque sensor is adapted to be assembled in the region within the marked boundary II of FIG. 1.

In order to simplify the description the components that correspond to those in FIG. 1 have been given the same reference numerals but with a prime notation. Only components that are substantially different have been given new reference numerals.

Figure 2:
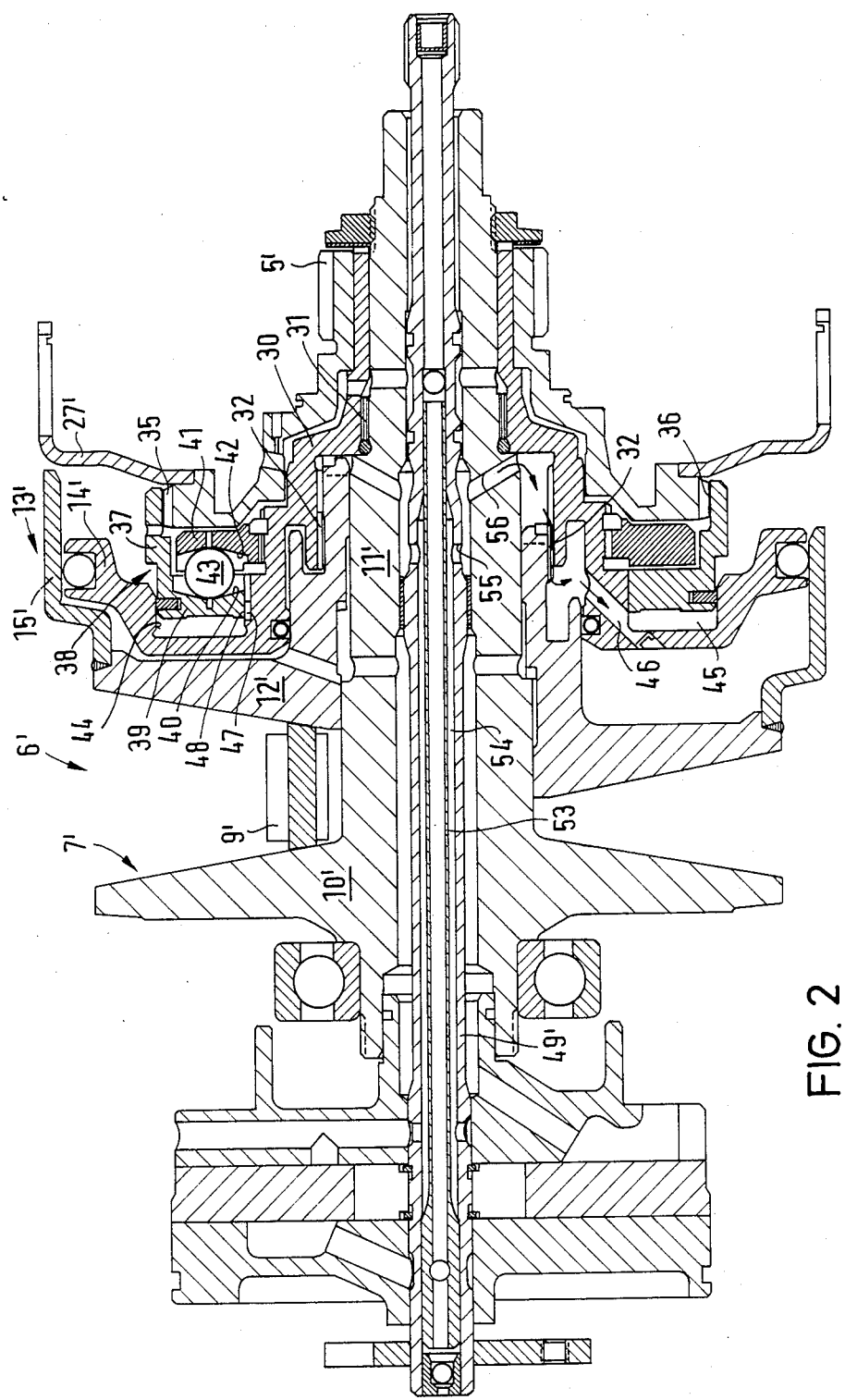
FIG. 2 shows an enlarged view of the region indicated in the circle II in FIG. 1 with a torque sensor incorporated in accordance with the invention.

As may be seen from FIG. 2, it is only necessary to consider the region of the primary shaft 7'. The primary shaft 7' essentially comprises an axially stationary primary shaft part 11', which comprises a fixed cone pulley part 10' that forms the driving shaft of the belt-drive transmission 6'. An axially displaceable cone pulley part 12', which is displaceable by way of an hydraulic displacement device 13', comprises a stationary displacement piston 14' and an axially displaceable displacement cylinder 15'. Device 13 is mounted on the axially fixed primary shaft part 11'.

In contrast to the design according to FIG. 1, the stationary displacement piston 14' is not rigidly connected directly to the sun gear. It comprises a multiple stepped sleeve part 30, which is rotationally and rigidly connected at 31 to the driving shaft 11' by way of a spline. On a step-like offset the sleeve part 30 is connected rotationally and rigidly but axially displaceable relative to the cone pulley part 12' by way of a splined connection 32.

Sun gear 5' is mounted on the sleeve part 30 so as to be axially rigid but rotatable with respect to the latter. The sun gear 5' is again connected to a driving collar 27', which not only forms a driving connecton with the forward gear clutch but also comprises teeth 35 on an annular shoulder.

Teeth 36 on an annular projection 37, which is formed on the rear a first rotary cam ring 38, engage teeth 35 on the annular shoulder. On its front side the rotary ring 38 forms an annular piston 39 and on its rear side it comprises a V-shaped curved track 40 extending in the peripheral direction. A second cam ring or support ring 41, which likewise comprises a V-shaped curved track 42 extending in the peripheral direction, is provided opposite the rear of the rotary ring 38. The support ring 41 is connected both axially and rotationally rigidly to the sleeve part 30 of the stationary displacement piston 14'. Rolling elements or cam follower 43 are interposed between the two curved tracks 40 and 42.

With its front side forming an annular piston 39 the rotary ring 38 is disposed in an annular cylinder 44 in the stationary displacement piston 14'. It forms a fluid pressure chamber 45.

The fluid pressure chamber 45 is supplied with fluid pressure through a first duct 46. Pressure fluid can normally flow from chamber 45 by means of additional duct 47. The additional duct 46 is arranged so that one edge 48 of the annular piston 39 acts as a control land for the additional duct 47. As soon as the rotary ring 38 rotates relative to the support ring 41 on account of a change in torque, it is axially displaced by the rolling elements rolling on the curved tracks 40 and 41.

In the case of the transmission unit illustrated in FIG. 1, a hollow pump driving shaft 49 drives a fluid pressure pump. It also supplies the pressure fluid to the forward gear clutch 26. Shaft 49 extends through the primary shaft 7 and in particular through the hollow shaft part 11. The pressure fluid can pass out of the hollow pump driving shaft 49 by way of radial bores 50, which communicate with radial bores 41 in the primary shaft part 11. Bores 51 are connected to a duct 52 which is in communication with the pressure space formed by the annular cylinder 28 and the annular piston 29 of the forward gear clutch 26.

In the case of the transmission unit illustrated in FIG. 2, additional pressure fluid is required for the torque sensor. The additional pressure fluid is supplied by a separation pipe 53 disposed in the pump driving shaft 49', thus forming a pressure fluid duct 54 connected by way of radial bores 55 in the pump driving shaft 49' and radial bores 56 in the primary shaft part 11' to a first space inside the sleeve part 30. Fluid flows from there through gaps in the splined connection 32 into a second space inside the sleeve part 30, from where it reaches the pressure medium space 45 of the torque sensor by way of the duct 46.

In this way the torque sensor can be fitted inside the existing transmission space, thereby ensuring its supply with pressure fluid.

I claim:

1. In an infinitely variable belt drive for delivering torque from a driving torque delivery shaft to a driven torque delivery shaft;

an adjustable primary sheave assembly having an axially fixed sheave part and an axially adjustable sheave part;

an adjustable secondary sheave assembly having an axially fixed sheave part and an axially adjustable sheave part, said secondary axially fixed sheave part being connected to said driven shaft;

a drive belt connecting said sheave assemblies drivably;

a ratio controlling servo for adjusting the sheave parts of each sheave assembly, the servo for one sheave assembly comprising a cylinder movable with the adjustable sheave part of said one sheave assembly with an axially fixed piston assembly;

a torque sensor piston assembly in said torque sensor cylinder comprising a first cam ring connected to said axially fixed one sheave part and a second cam ring adapted to be connected to one of said torque delivery shafts;

cam followers between said cam rings adapted to separate said cam rings axially with a force that is proportional to the torque applied to said belt drive;

said axially fixed piston assembly having a pressure force reaction part that defines with said servo assembly cylinder a working pressure chamber;

said second cam ring defining with said pressure force reaction part a control pressure chamber;

a control pressure supply passage extending to said control pressure chamber and a control pressure outlet flow passage extending from said control pressure chamber; and a control orifice in said piston assembly, said second cam ring registering with said control orifice to vary the flow area of the latter in accordance with the magnitude of torque applied to said cam rings.

2. The combination as set forth in claim 1 wherein said belt drive includes a forward drive clutch adapted to connect said driving shaft and said second cam ring.

3. The combination as set forth in claim 2 wherein the pressure in said control pressure increases when the size of said control orifice area decreases thereby providing a control pressure in said control pressure chamber that is proportional to the torque transmitted through said belt drive.

* * * * *